March 31, 1964 R. M. WEYGANDT ETAL 3,126,692
MACHINE FOR HARVESTING BERRIES AND SIMILAR
PRODUCE FROM THEIR PLANTS
Filed May 28, 1962 7 Sheets-Sheet 1

RAYMOND M. WEYGANDT
RAYMOND A. WEYGANDT
INVENTORS

BY James D. Givnan
ATTY

March 31, 1964 R. M. WEYGANDT ETAL 3,126,692
MACHINE FOR HARVESTING BERRIES AND SIMILAR
PRODUCE FROM THEIR PLANTS
Filed May 28, 1962 7 Sheets-Sheet 4

Fig. 6

RAYMOND M. WEYGANDT
RAYMOND A. WEYGANDT
*INVENTORS.*

RAYMOND M. WEYGANDT
RAYMOND A. WEYGANDT
INVENTORS

3,126,692
MACHINE FOR HARVESTING BERRIES AND SIMILAR PRODUCE FROM THEIR PLANTS
Raymond M. Weygandt and Raymond A. Weygandt, both of Rte. 1, Box 308, Canby, Oreg.
Filed May 23, 1962, Ser. No. 202,037
12 Claims. (Cl. 56—330)

This invention relates to improvements in harvesting machinery and more particularly, though not restrictively, to a machine for mechanically harvesting ripe berries from their bushes planted in rows.

The present application is a continuation-in-part of our prior application, Serial No. 58,757, filed September 27, 1960, now abandoned.

It is one of the principal objects of the invention to provide a machine of this character which will produce a clean separation of ripe berries from the bushes by imparting to the fruiting canes thereof, a gentle, but highly effective oscillatory motion and in such a manner that the ripe berries will fall from the bushes and wherein the harvesting instrumentalities will leave the bushes free of injury and in condition to produce further berries.

Another object is to provide a machine of this character which is self-propelled, power driven, automatic in its harvesting operations and wherein flat, smooth-surfaced, inflexible vertically disposed and generally longitudinally extending shaker elements herein illustrated in the form of beater panels are utilized and so arranged as to pulsate the foliage of the bushes in alternating opposite directions as the harvester moves forwardly, whereby the bushes will be presented in different positions to the action of the beater panels and thereby insure more complete harvesting of the ripe berries.

A further object is to construct a berry harvesting machine in such a manner that all the berries removed from the plants shall be conveyed through means for separating chaff, dust, and other foreign material from the berries before passing them to a suitable receptacle in which they may be transferred to a truck or other means of transportation or storage.

A further object is to so construct and arrange endless conveyer means that in passing from the front to the rear of the machine the returning portion of such conveyer means shall be so disposed as to prevent the same from carrying berries toward the front of the machine and so that the bottom run of said conveyer means will be disposed below the path of movement of the lower extremities of the beater panels.

A still further object is the provision of a flooring made of yieldingly and pivotally mounted overlapping shutters, adapted to open and close relative to the longitudinal center line of the harvester to accomodate the stalks of the bushes as the machine moves forwardly and thus prevent injury to the bushes and eliminate loss of berries during the harvesting of the same.

A still further object of the invention resides in the method of dislodging ripe berries from berry bushes in a row in the manner described by arranging said panel members in upright parallel relation one on either side of the row in generally opposed relationship and spaced apart a distance less than the diameter of the bushes to compress the bushes, and by contacting the bushes from the sides with the oscillating flat upright surface of the panel members at a rate not less than one time per second and with the oscillating strokes stopping short of the vertical center axis of each bush. The panel members are slid along the row in a direction parallel to the row and concurrently with the sliding movement the panel members are moved in unison back and forth transversely of the row at a rate greater than two cycles per second while maintaining said spaced relationship to shake each bush entirely and thus dislodge ripe berries therefrom.

A still further object is the provision of new and novel driving and driven pulleys and novel conveyor belts entrained thereover, wherein each belt is provided with integrated side flanges and buckets integrated therebetween and the running relationship of the belts to the pulleys is such that harvested berries or any foreign matter separated therefrom will at all times during conveyance be confined within the bucket components and thus precluded from entrapment between the pulley and belt flanges which would result in belt and/or pulley slippage.

A still further object is the provision of a berry harvester which is efficient in operation, economical to use, suited for one man operation, and one which will save labor costs, since it eliminates all necessity for manual contact with the berries.

The foregoing and other objects and advantages which will become subsequently apparent reside in the details of construction and operation as more fully hereinafter described and claimed, reference being had to the accompanying drawings forming a part hereof and in which:

FIGURE 9 is a sectional detail view, on an enlarged scale, taken approximately along the line 9—9 of FIGURE 5.

With continuing reference to the drawings, wherein like reference characters designate like parts, reference numeral 1 indicates generally the chassis or main frame of the harvester supported upon ground engaging traction wheels 2 and steerable idling wheels 3. The main frame comprises longitudinal top frame members 4 and 5, interconnected at the forward and rearward ends by cross members 6 and 7, interconnected intermediate their ends by tubular cross members 8 and 9 and supported at its rearward corners by posts 9A. A top deck 10 is supported by the main frame 1 and upon the deck is mounted an internal combustion engine 11 of any suitable type and horsepower and connected in the conventional manner by a drive shaft 12 to a differential within a housing 13 and to driving axles 14 within housings 15. The ends of the axles are provided with sprocket wheels 16 operatively connected by sprocket chains 17 to driven sprockets 18 on the ends of the axles 19 of the traction wheels 2.

The forward end 6 of the main frame is pivotally attached by wearplates 22 to a cross member 23 of an inverted U-shaped frame indicated generally at 24 and the leg members 25 and 26 thereof are pivotally connected as at 26A to the forward ends of tie-rods 26B whose rearward ends are similarly connected to the corner posts 9A. Two hollow tubular members 27 and 28 are rotatably mounted by means of brackets 29, 30, 31 and 32 to the leg members 25 and 26. Tubular members 35 are fixedly secured between the brackets 29, 31, and brackets 36 secured to the cross member 23. Similarly tubular members 38 are fixedly secured between the brackets 30, 32, and brackets 39 and 40 secured to the bottom ends of the leg members 25 and 26. Rods 42 are rotatable within the fixed tubular members 35 and connected to the top end of the tubular members 27 and 28. Similarly rods 43 are rotatable within the bottom fixed tubular members 38, connected at their top ends to the bottom ends of the tubular members 27 and 28, and at their bottom ends to stub axles 46 of the steerable wheels 3. The top end of the rods 42 are secured to the forward end of steering arms 48 whose rearward ends are interconnected by a tie-rod 49. An arm 52 is pivotally and slidably connected as at 53 to the tie-rod 49 and the top end of the arm 52 is secured to a shaft 54 provided with a worm gear 55 (see also FIGURE 6) enmeshed with a worm 56. The worm 56 is secured to the bottom end of a shaft 57 whose top end is provided with a bevel gear 58 enmeshed at all times with a matching bevel gear 59 secured to a shaft 59A journaled in suitable bearings 61 and provided at its rearward end with a steering wheel 62. From the foregoing it will be apparent that the machine can be accurately driven along rows of berry bushes or other row crops by a single operator stationed on a seat 63.

Secured to and extending downwardly from the underside of the forward end of the top frame members 4 and 5 (see FIGS. 1, 2 and 6) is an inverted U-shaped frame member 65 to the leg members of which are secured two inwardly and rearwardly curved bush-gathering members 66 extending forwardly to pointed ends 67 to provide a narrowing passage leading to the front end of the flooring 70 which comprises a plurality of opposing shutters, indicated generally at 71 and 72 and normally disposed in generally herring-bone fashion. Each shutter is pivotally mounted (see FIGURE 9) by a collar 73, upon a vertical pin 74 mounted upon a bridge 75 secured at its ends to the flanges 76 of a channel member 77 secured within trays 79 and 80, extending forwardly and rearwardly of the flooring 70 as shown. Each shutter is normally held in a closed position by a coil spring 78, whose one end bears against or may be secured to one flange of the channel member and whose other end is secured to the collar 73. Accordingly, the shutters will progressively, yieldingly open and close about the stalks of the berry bushes as the machine travels along the row. The leading edge of each shutter is flanged downwardly as at 82 to present a flat, vertical surface against the stalks and this feature and the lightness of the springs prevent any operational damage to the stalks of the bushes.

The shutters are tilted outwardly and downwardly to overlie the inner marginal edges of conveyer belts 85 provided with ridges 85A along both of their marginal edges and entrained over grooved idling pulleys 86 rotatably mounted as at 88 upon rails 89 elevated from the deck 10 by supporting posts 90. Both belts are entrained over and driven by driving pulleys 92, secured to a shaft 93, driven in a counterclockwise direction by a pulley 94, connected by a belt 95 to a pulley 96, driven by the driving pulley 97, of a conventional speed reducer 98, connected by a belt 99 to the power take-off shaft 99A of an internal combustion engine 100, mounted upon the rearward end of a platform 101 secured to posts 9a. Both conveyer belts 85 are also entrained over idling pulleys 101A rotatably mounted at the forward and rearward ends of the trays 79 and 80. The top and bottom reaches of the conveyer belts 85 run in the direction of the arrows applied to them in FIGURE 2, and each belt is provided with buckets 104 disposed between the marginal ridges 85A in such a manner as to not interfere with the functioning of the grooved, idling and driving pulleys.

A cross conveyer belt 107 is entrained over rollers 108 and 109, journaled by their shafts 110 and 111 in bearing blocks 112 and 113, mounted upon parallel frame members 114. The shaft 110 of roller 108 is provided with a pulley 115, driven by a belt 116 and a right angle drive 117 which is driven by a belt 118 entrained over a pulley 119 secured to the outer end of the shaft 93.

Figures 1, 7:
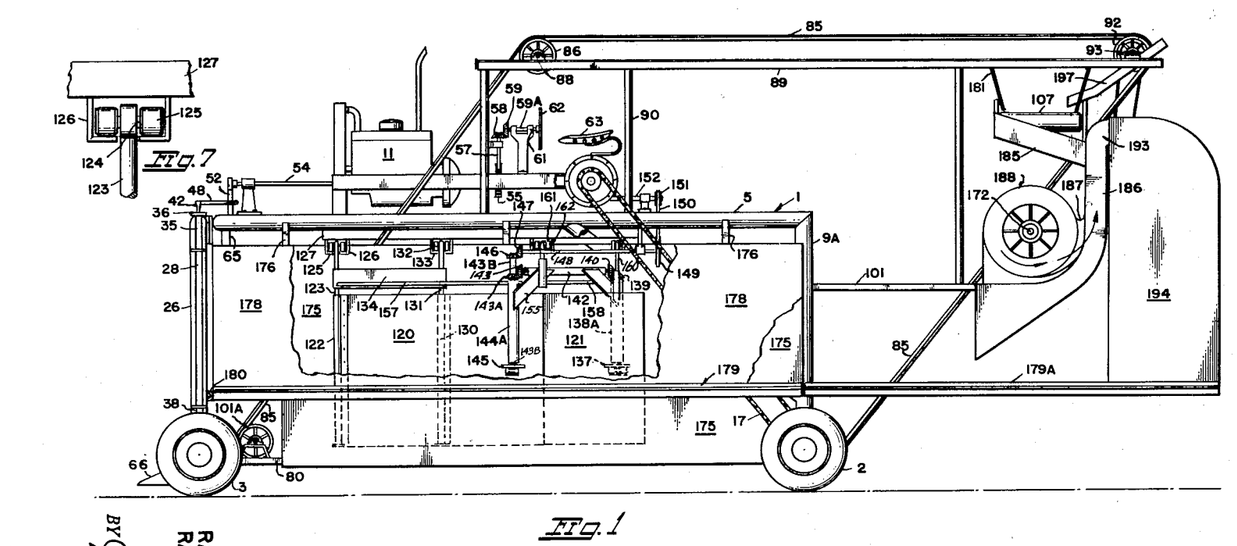
FIGURE 1 is a side elevational view of a harvesting machine made in accordance with our invention and with fragments broken away for convenience of illustration.
FIGURE 7 is a fragmentary detail end view of a typical track member and suspending means for the beater panels.
Figure 2:
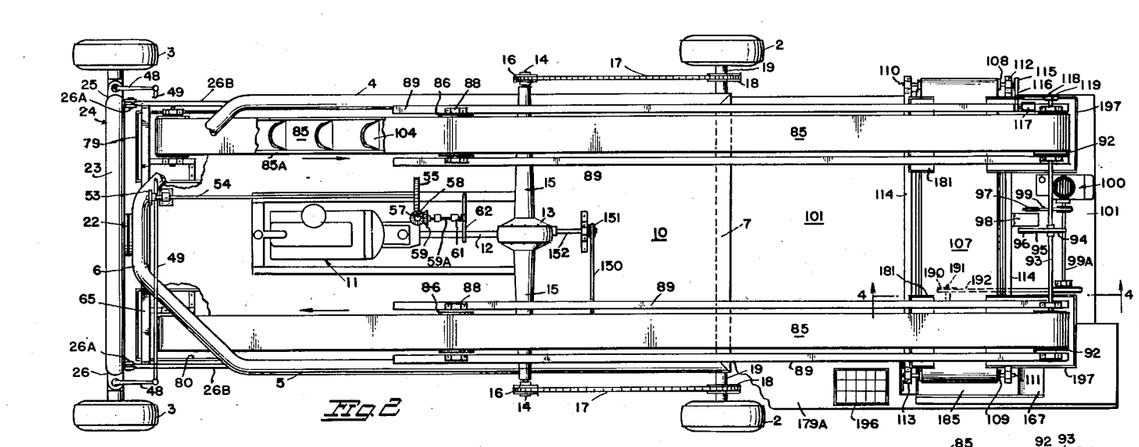
FIGURE 2 is a top plan view of FIGURE 1 with some parts removed and fragments similarly broken away.
Figure 3:
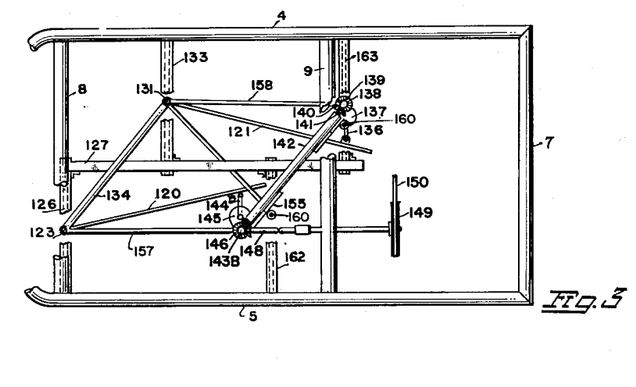
FIGURE 3 is a top plan view of the beater mechanism of the invention.
Figure 6:
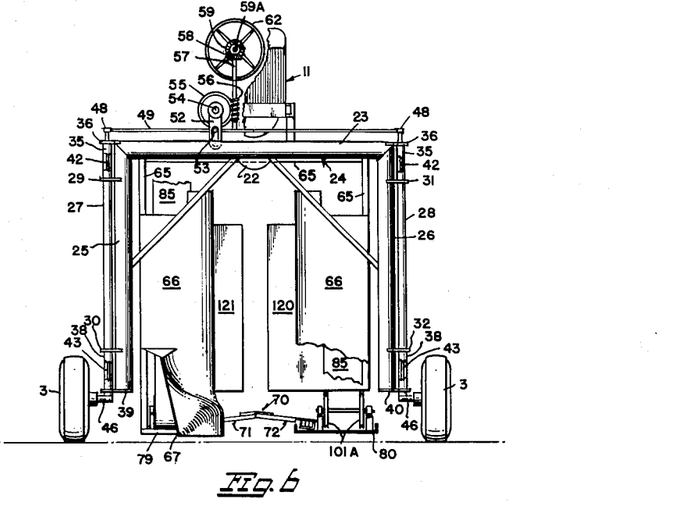
FIGURE 6 is a front elevational view of FIGURE 1, also with parts removed and with fragments broken away to illustrate rearwardly disposed parts.
Figure 7:
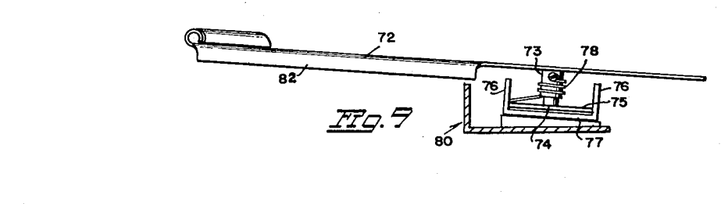

Disposed above and rearwardly from the front end of the flooring 70 are two transversely spaced apart vertically disposed beater elements 120 and 121 arranged one ahead of the other as shown in FIGURE 3. Both elements 120—121, as clearly shown in FIGURES 1, 3 and 6, are in the form of substantially square or rectangular inflexible panels having flat smooth-surfaces on both sides thereof. Panel 120 is hingedly attached as at 122 to a vertical shaft 123 carried by the axle 124 (see FIGURE 7) of a pair of rollers 125, operable in a track 126 secured to the under-side of the cross frame member 8 and to the under-side of one end of a beam 127 secured to the underside of the cross frame members 8 and 9. Similarly, panel 121 is hingedly attached as at 130 to a shaft 131, depending from rollers 132, operable in a track 133 secured to the under-side of the beam 127 and to the underside of the frame member 4. Both shafts 123 and 131 are interconnected by a cross member 134. The rearward end of panel 121 is connected by a link 136 to a cam member 137 secured to the bottom end of a shaft 138 rotatable in a tubular member 138A, and provided at its top end with a bevel gear 139, enmeshed with a companion gear 140, secured to a shaft 141 extending through a tubular member 142 and provided at its opposite end with a bevel gear 143 enmeshed with a companion gear 143A secured near the top end of a shaft 143B rotatable within a tubular member 144A. The bottom end of shaft 143B is connected to a cam 145 to which the rearward end of beater panel 120 is connected by a link 144B. The top end of the shaft 143B (see FIGURE 1) is provided with a bevel gear 146 meshing with a companion gear 147 secured to the forward end of a shaft 148 whose rearward end is provided with a pulley 149, driven by a belt 150 entrained over a driving pulley 151 (see also FIGURE 2) secured to the outer end of a conventional power takeoff shaft 152 extending rearwardly from the conventional differential housing 13, as employed in tractors and similar vehicles.

The tubular members 138A and 144A and the cross member 142 are interconnected and reinforced by gusset plates 155. The top end of tubular member 144A is connected to one end of the cross member 134, by a rod 157 and the opposite end of said cross member is connected by a rod 158 to the top end of the tubular member 138A. The cross member 142 and hence the vertical tubular member 138A and 144A are suspended as a unit by shafts 160 carried by rollers 161, operating in tracks 162 and 163, secured respectively to the under-side of the frame rail 5, the under-side of the beam 127, and to the under-side of the opposite frame member 4. The interconnections between the panels 120 and 121 and their associated actuating mechanisms render the entire assembly capable of functioning as a unit moving laterally relative to the flooring 70 along the tracks 126, 133, 162, and 163 and at the same time allowing the beater panels 120, 121 to oscillate alternately from side to side, the amplitude of the oscillations of course being determined by the setting of the links 144B and 136 relative to their cam members 145 and 137.

To confine the harvested berries to the area of the flooring 70 we provide two vertical inside walls 175 secured at their bottom edges to the outside flanges of the trays 79 and 80 secured by hangers 176 to the top main frame members 4 and 5. The bottom marginal edge of each wall is provided with a downwardly and inwardly inclined deflector apron 177 overlying the outer ridges 85A of the conveyer belts 85. An outside wall 178 is secured along its bottom edge to the inside edge of a forward shelf portion 179 pivotally connected as at 180 to the leg member 26 of the inverted U-frame 24.

The machine will be described as related to berry bushes and the harvesting of ripe berries therefrom, although it should be understood that the machine is adaptable to the harvesting of other produce from their plants. The instant invention is adapted to be used to remove ripe berries from the bush without injury to the bush so that immature berries may have the opportunity to grow to become ripe berries.

Figures 5, 8:
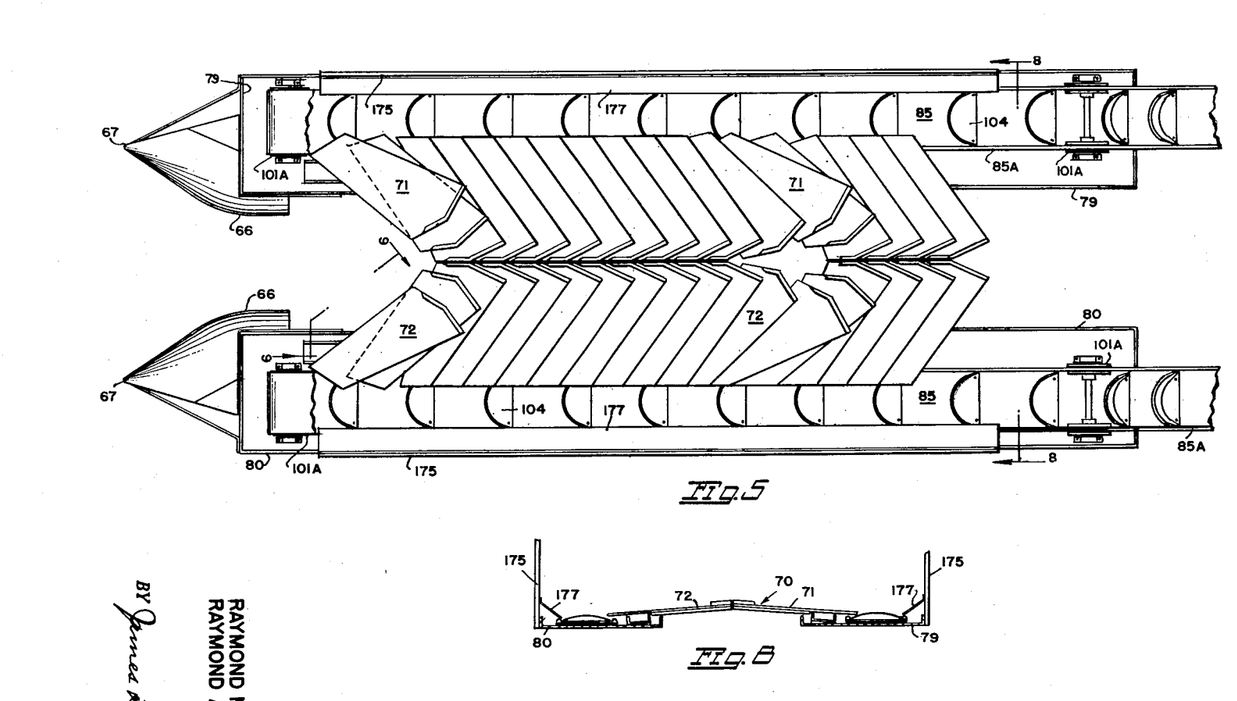
FIGURE 5 is a top plan view of a flooring made upof a plurality of shutters operable automatically to permit passage of the stalks of the plants through the flooring and for causing harvested berries to gravitate onto a pair of conveyer belts.
FIGURE 8 is a sectional end elevational view, taken approximately along the line 8—8 of FIGURE 5.

In operation, the machine is driven along a row of berry bushes with the center line of the flooring 70 passing along the center line of the row of bushes being dealt with. As the machine moves along the row the bushes are progressively received into the front end of the machine and against the shutters at the front end of the flooring. As the stalks of each bush pass between the yieldingly pivoted shutters, the shutters will open to allow passage of the stalks and then close behind them as illustrated in FIGURE 5.

At the start of the run the panels 120 and 121 are put into oscillatory motion by their driving mechanisms previously described. Assuming that the arc of swing of the rearward or free ends of the panels is 7½ inches at a frequency of approximately 240 swings per minute, similar motion will be imparted to the fruiting canes of the bushes sufficient to effectively dislodge the ripe berries therefrom. The sweep of the panels is such that they act against the side and rearward portions of each bush progressively and alternately in a forward brushing movement, but both panels being movable laterally as a unit as aforesaid will yield from one side to the other to the resistance of the bushes by means of the tracks and rollers from which the panel assembly is suspended to thus prevent injury to the bushes or damage to the panels.

Figure 4:
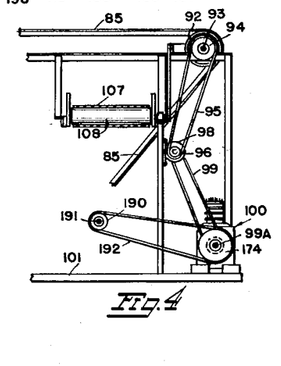
FIGURE 4 is a sectional side elevational view taken approximately along the line 4—4 of FIGURE 2.

Ripe berries dislodged from the bushes by the action of the beater panels 120, 121 along with chaff, dust and any other foreign material falling upon the downwardly and outwardly sloping shutters 71 and 72 will be thrown laterally as well as gravitate therefrom by the outward swing of the shutters, onto the bottom run of the conveyer belts 85. The conveyer belts travel rearwardly and upwardly over the driving pulleys 92, where the berries carried upwardly by the buckets 104, now inverted, will spill onto the cross conveyer 107, from which they will be delivered by a downwardly and rearwardly inclined tray 185 into a vertical chute 186, the throat of which is in open communication as at 187 with a blower fan indicated generally at 188 mounted upon the platform 101 and driven by a pulley 190 (see FIGURE 4) secured to its shaft 191 and driven by a belt 192, entrained over a second pulley 174 secured to the engine shaft 99A. The top end of the chute 186 is in open communication as at 193 with the top end of a housing 194 opens at its bottom end to discharge dust and any other foreign matter blown from the berries by the airstream from the blower in an upward direction as indicated by the arrows as the berries tumble downwardly through the chute. The chute is flared downwardly at its bottom end to provide a discharge opening as shown, from which the berries can be deposited into boxes or similar containers indicated as at 196 and slidable along the shelves 179—179A into stacked positions against the outside wall 178.

To concentrate the discharge of the berries from the conveyer belts 85 onto the cross conveyer belt 107 we provide collecting trays 197 and baffle plates 181 suspended from the rails 89.

Each of the plate-like shutter members 205 in each series 206 and 207 of the modified form of flooring shown in FIGURES 12–15 is pivotally mounted near its outer end by means of a pivot pin 208 (see FIGURE 15) welded to the underside of the shutter and extending through a detent 209 also welded to the underside of the shutter. The pin extends through a bridge member 210 welded at both of its ends to parallel rails 211–212 (see also FIGURE 13) whose bottom edges are securely held respectively against the bottom wall 213 and to a lateral flange 215 of a conveyer-supporting tray or track 214 by a series of other bridge members 220 welded at both of their ends to the rail members 211—212 and secured to the bottom wall of the tray 214 by means of hold-down bolts 221. If desired, the bridge members 220 may be dispensed with by welding the bottom edges of said rail members respectively to the bottom wall of the tray 214 and to said lateral flange 215 thereof.

A sleeve 222 surrounds the pin 208 (see FIGURE 15) below the bridge member 210 and the lower end of the pin extends below the bottom of the sleeve and is threaded to accommodate a nut 223 adapted to be locked to the pin 208 by a suitable set screw 224. The nut is provided with a radial arm 225 turned upwardly at its outer end as at 226 to provide a detent for one end 227 of a spiral spring 228 coiled about the sleeve 222 and terminating at its opposite end as at 230 against the inside of the rail 212.

Figures 10, 11, 14, 15:
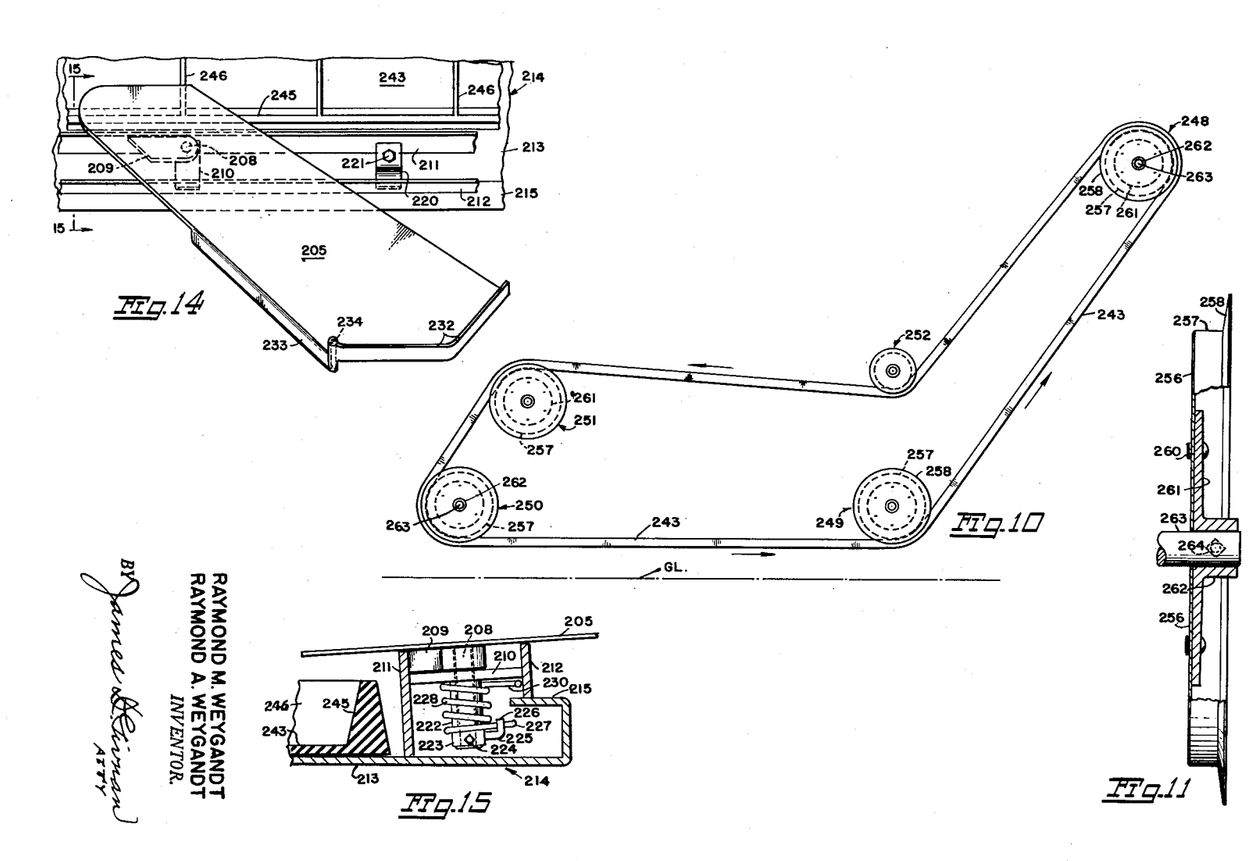
FIGURE 10 is a side elevational view of a modified form of typical endless conveyer belt, a roller and modification of typical pairs of driving and driven supporting pulleys for the belt.
FIGURE 11 is an edgewise view of a typical driving or driven pulley of FIGURE 10 on an enlarged scale and with fragments broken away to reveal internal parts.
FIGURE 14 is a top plan detail view of a typical shutter of the modified flooring arrangement shown in FIGURE 12.
FIGURE 15 is an enlarged sectional end elevational view taken approximately along the line 15—15 of FIGURE 14.
Figure 12:
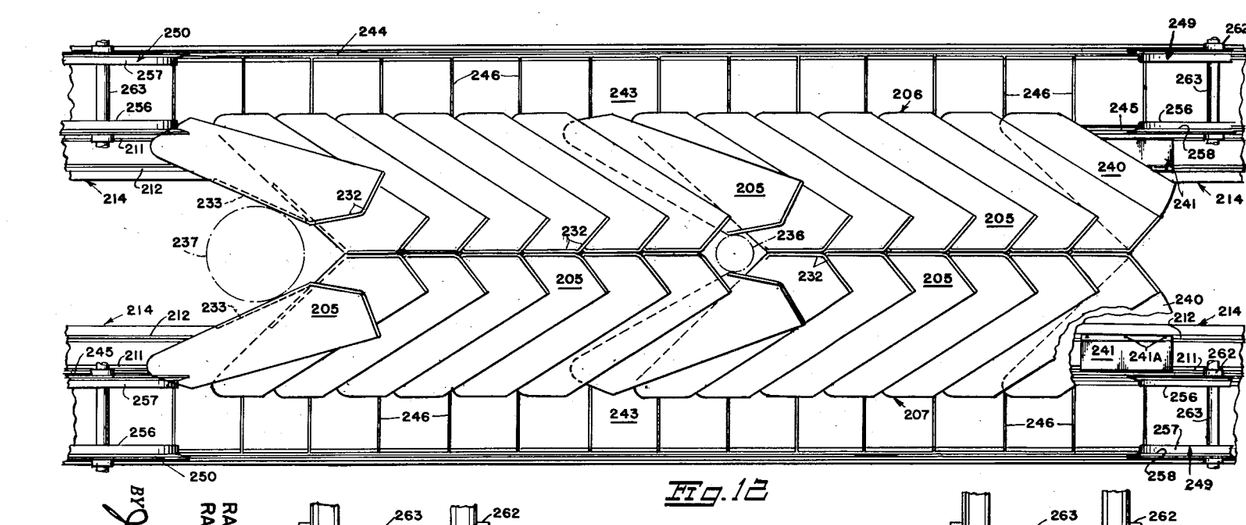
FIGURE 12 is a view similar to FIGURE 5 on an enlarged scale illustrating a modification of the flooring, certain of the driven pulleys, and conveyer belts shown in FIGURE 5.
Figure 13:
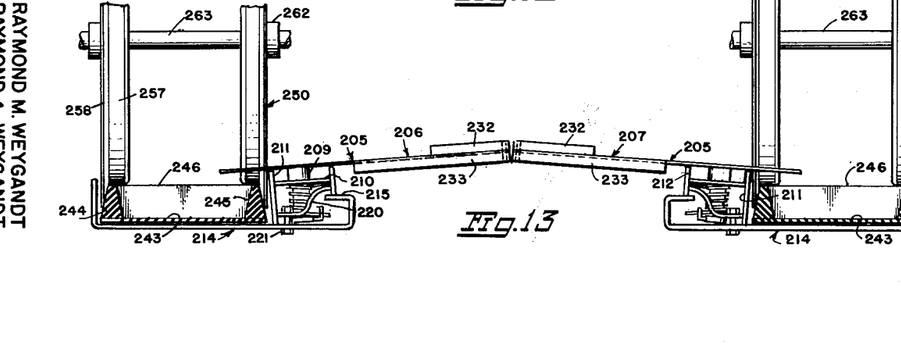
FIGURE 13 is an end elevational view of FIGURE 12 on an enlarged scale with fragments of the forward driven pulleys broken away.
Figure 16:
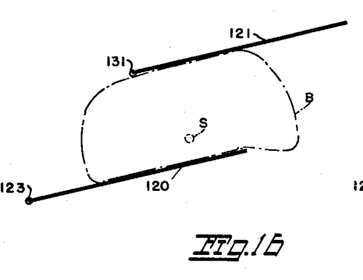
FIGURES 16, 17, and 18 are views illustrating diagrammatically the manner in which the panel members slidably and compressibly impinge in unison against both sides of the berry bush in one transverse direction.
Figure 17:
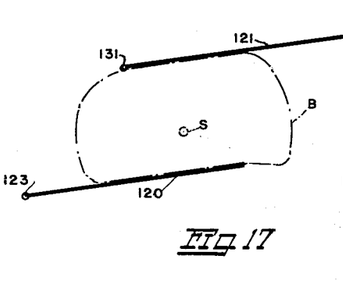
Figure 18:
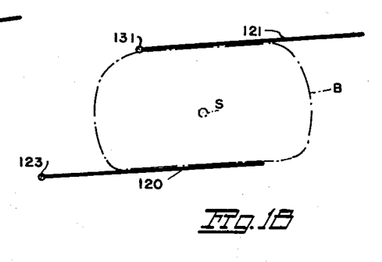
Figure 19:
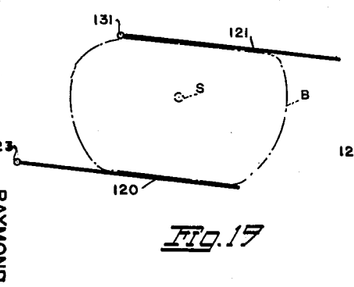
FIGURES 19 and 20 show such panel action in an opposite transverse direction resulting in the compressing and shaking action of the bush as illustrated diagrammatically in FIGURE 21.
Figure 20:
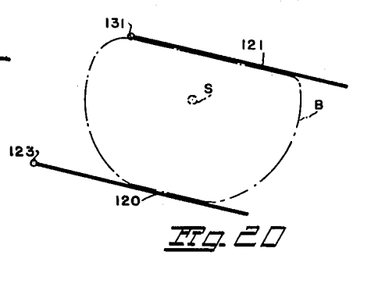
Figure 21:
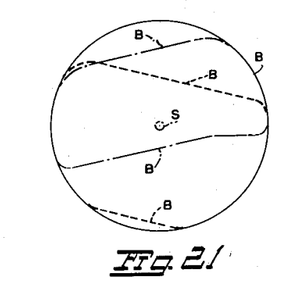

The inner end of each shutter member in each series thereof, as best illustrated in FIGURES 13 and 14, is flanged upwardly as at 232 and downwardly as at 233 for a portion of the length of its leading edge. One end of the flange 232 is welded to a pin 234 to which the forward end of the flange 232 is also welded and the purpose of the pin is to reinforce those ends of the flanges against bending or twisting upon impact with the stalks of plants being dealt with, such, for example, as indicated by the broken-line circle 236 in FIGURE 12. The downwardly turned flanges 233 protect the stalks of the plants from any cutting action of the relatively thin shutter plate which would occur in the absence of the flanges within the approximate area indicated by the second broken-line circle 237.

The last shutter plate 240 at the rearward end of each series 206—207 is flanged downwardly for a portion of its leading edge only and underlying these plates are the horizontal flanges of angle members 241 whose vertical flanges are secured by sheet metal screws 241A or the like to the sides of the rails 212. The free marginal edges of the horizontal flanges bear down upon the top of the rails 211 and the underlying space between the rails is thus closed off to prevent spillage or overflow of berries thereinto or the accumulation of debris or other foreign matter which would otherwise interfere with the proper functioning of the shutters.

The shutter members in both series are tilted downwardly and outwardly as in the first form of the invention with their outer end portions overlying respectively the inner marginal edges of the two endless conveyor belts 243. The belts are preferably though not restrictively made of Neoprene, fabric-impregnated rubber or the like and integrally molded with side flanges 244—245 and spaced apart transverse vanes or buckets 246.

Each belt (see FIGURE 10) also as in the first form of the invention is entrained over driving pulleys 248, driven pulleys 249, 250, 251, and under a roller 252 flanged at both of its ends. The pulleys 248–251 comprise two identical members each made (see FIGURE 11) of sheet metal spun from a flat piece thereof to provide a circular disc 256, a circumferential right-angular rim 257 and an outwardly tapering circumferential flange 258, the taper of which matches that of the side flanges 244—245 of the conveyor belts. This is an important feature because it precludes entrapment and mashing of berries between the pulley flanges and those of the conveyor belts which could cause slippage of the pulleys relative to the belts or vice-versa.

The disc of each pulley member is secured concentrically, by rivets 260 or the like, to a supporting disc 261 cast integrally with a hub portion 262 by means of which the pulley members in each pair are secured to and rotatable with a common shaft 263 by means of a set screw 264.

The buckets of both conveyor belts 243 of FIGURES 10 and 12 and 85 of FIGURES 1 and 5 of the first form of the invention open upwardly along the bottom run of the belts and downwardly along the top run thereof and the unique entrainment of the belts about their respective lowermost driven pulleys permits of the advantageously low ground clearance between the bottom run of the belts and the ground line GL.

The members 209 of the shutters 205 function as stops to limit inward movement of the shutters, which inward movement is caused by the springs 228. When the shutters are at their innermost positions, the inner edges of opposed shutters are in contiguous relationship, i.e. touching or very close to touching.

It is pointed out that when the forward shutters are shoved outwardly and rearwardly, the pins 234 of such shutters will be brought against the forward edges of the shutters disposed immediately rearwardly of the first mentioned shutters. Thus these pins 234 receive the shock of contact (which though of a low order, is repeated often) and thus the pins prevent the inner portions of the flanges 233 from being knocked loose from the bodies of the shutters.

With the belt conveyor 243, it is apparent that the capacity of the belt is considerably greater than that of the belt 85 of FIG. 1, because the vanes or buckets 246 of the belt 243 can extend upwardly to the level of the apex portions of the belt flanges 245 whereas the pocket forming members 104 of the belt 85 cannot extend up so far. This is because with a V-groove sheave, clearance at the inner faces of the belt flanges must be left for the inner flanges of such sheaves.

We have discovered that it is not necessary to mount the panels 120 and 121 on a laterally shiftable side frame, since a driver soon learns to center the vehicle properly on a row. Thus in the preferred form of the invention, the panels 120 and 121 are pivoted about vertical axes which are in fixed relation to the main frame of the machine.

Also, while the panels 120 and 121 are shown in FIG. 3 operating in opposed relationship, we have discovered that distinctly superior harvesting is attained when the panels are arranged in parallel relation and are swung back and forth in unison. By spacing the panels so that the distance between them, when they are parallel to the line of travel, is less than the diameter of the bushes to be harvested (that is, the thickness of the row of bushes), the bushes are compressed somewhat by the panels as the panels engage the bushes and provide a zone of compression. As the panels are pivoted back and forth in unison they swing the whole bush or bushes which they engage back and forth at a predetermined rate. This rate is sufficient to dislodge a high percentage of ripe berries but very few unripe berries. For black raspberries the ideal frequency has been found ot be around 240 cycles per minute. Because of variations in growing conditions, the weather, etc., some variation in this rate may have to be made in order to achieve the highest degree of efficiency. Normally, variations between 220 and 260 cycles per minute have proved sufficient for attaining the desired harvesting of ripe berries. Below 200 cycles per minute, unsatisfactory ripe berry removal occurs, while above 280 unsatisfactory unripe berry removal occurs.

Other berries, for instance gooseberries, require a higher frequency, as much as 500 cycles per minute in order to attain separation of ripe berries. Between 450 and 500 cycles per minute has proved generally satisfactory.

Ripe red raspberries can be removed with a frequency of between 120 and 240 cycles per minute, while ripe evergreen blackberries can be removed with a frequency of 200–240 cycles per minute.

The primary removal of berries is caused by the "throat" between the panels in which the bushes are in effect held by the panels, as if by two large hands, and are shaken back and forth so the entire bush is shaken at the desired frequency.

It is pointed out that as the panels 120 and 121 are moved along a row of bushes, oscillating the bushes back and forth, the row of bushes is caused to move in a sinuous path. The speed of movement of the machine, with the panels oscillating at around 240 cycles per minute, will be approximately one mile per hour. This means that each bush will be subjected to a plurality of oscillating movements depending on the dimensions of the panels. It has been found that from four to eight oscillations of a bush at the optimum frequency is sufficient to remove practically all of the ripe berries without removal of only a relatively few unripe berries.

Thus, the unripe berries left on the bushes can be allowed to ripen, and the machine driven over the field again to harvest them, and without damaging the bushes, to enable them to produce berries the following year.

Another advantage of the present invention is that the bushes can be planted closer together. For instance, with black raspberries, the usual spacing is around four to five feet, to enable hand pickers to gain access to all sides of the bush without injury from the sharp thorns. With the present machine, the bushes can be planted only three feet apart, thus increasing the yield per acre.

In harvesting black raspberries it has been ascertained that proper harvesting is attained with the panels stopping short of the central axes of the bushes. With gooseberries, a setting of the amplitude of oscillation of the panels such that the panels (that is, the free ends of the panels) move past the central axes of the bushes has proved effective in removing ripe berries.

The degree of initial compression of the bushes (because of the panel spacing) should be such that a panel will remain in contact with the bush, when the panel is oscillated slowly, during the entire cycle of movement of the panel even in the absence of the opposed panel.

Thus striking contact between the panels and the bushes is avoided, to avoid breaking the spurs on which clusters of berries grow.

It is important that the panels be driven from a common drive so that they move in unison. The angle of swing of the panels 120 and 121 is relatively small, being between 5 and 15 degrees for black raspberries and from 12 to 20 or even 25 for gooseberries. Thus, while the width of the throat does vary somewhat during oscillation of the berries, this variation is not great and for small angles the change is unsubstantial.

It is apparent that with the panels of the present invention, there is no striking of the bushes or penetration or tearing through the bushes. The panels merely slide along the bushes to advance the zone of compression and to shift the zone of compression back and forth at the desired frequency. Thus the panels provide flat imperforate surfaces which have butting engagement with the bushes.

With reference to FIGURES 16–21 wherein the bushes B are shown in two separate rows (FIGS. 16–18 in one, and FIGS. 19–21 in the other) for convenience of illustration within the space provided, it is to be understood that the bushes are assumed to be lined up in a single row and so dealt with in the operation of the panels 120—121 moving as a unit along the bushes.

With the vehicle being driven along a row of bushes and properly centered relative to the stalks S thereof, it will be readily apparent, as above pointed out, that the panels do not strike the bushes nor penetrate or tear through the bushes. The panels merely slide along and against the bushes to advance the zone of compression and the extent thereof. For example, starting with FIGURE 16, the bush B is under maximum compression with both panels 120—121 at the start of their swing in a clockwise direction. As the panels continue to swing as the machine advances along the row the compression between panel 120 and the foliage of the bush on the adjacent side of that panel decreases while compression between the opposing panel 121 and the foliage adjacent thereto increases between the two extremities as indicated diagrammatically by broken and dotted lines respectively in FIGURE 21.

Conversely, when the panels swing in the opposite or counter-clockwise direction a progressive reversal of the compressing function just described takes place.

While we have shown particular forms of embodiment of our invention, we are aware that many minor changes therein will readily suggest themselves to others skilled in the art without departing from the spirit and scope of the invention. Having thus described our invention what we claim as new and desire to protect by Letters Patent is:

1. A self-propelled machine for harvesting berries and similar produce from their plants, comprising a frame having an opening throughout its length and adapted to straddle a row of plants,
   plant-gathering means at the forward end of said frame,
   a flooring arrangement extending lengthwise of the frame and comprising a plurality of laterally downwardly inclined yieldingly and pivotally mounted overlapping shutters adapted to open and close relative to each other about the stalks of a row of plants as the machine progresses along the row,
   conveyor means paralleling the sides of said flooring and partially underlying the outer edges thereof,
   a pair of beater panels swingably mounted within said frame, and interconnected at one of their ends for movement as a unit laterally relative to said flooring and for progressive contact with plants along a row,
   an engine carried by said frame,
   eccentric means carried by each of said beater panels and operatively connected to said engine to thereby impart oscillatory motion to the beater panels whereby said motion will be transmitted to the foliage of the plants impinged against by the beater panels and whereby berries dislodged from the plants by such motion and falling onto said flooring will be thrust laterally therefrom onto said conveyor means by the opening motion of said shutters,
   a cross conveyor belt positioned to receive berries picked up by said conveyor means and adapted to discharge the berries from the machine.

2. A self-propelled machine for harvesting berries and similar produce from their plants, comprising a frame having an opening throughout its length and adapted to straddle a row of plants,
   plant-gathering means at the forward end of said frame,
   a flooring arrangement extending lengthwise of the frame and comprising a plurality of laterally downwardly inclined yieldingly and pivotally mounted overlapping shutters adapted to open and close relative to each other about the stalks of a row of plants as the machine progresses along the row,
   conveyor means paralleling the side of said flooring and partially underlying the outer edges thereof,
   a pair of beater panels swingably mounted within said frame for progressive contact with plants along a row,
   an engine carried by said frame,
   eccentric means carried by each of said beater panels, and operatively connected to said engine to thereby impart oscillatory motion to the beater panels whereby said motion will be transmitted to the foliage of the plants impinged against by the beater panels and whereby berries dislodged from the plants by such motion and falling onto said flooring will be thrust laterally therefrom onto said conveyor means by the opening motion of said shutters,
   and conveying means positioned to receive berries picked up by said conveyor means and adapted to discharge the berries at a tray loading zone.

3. A self-propelled machine as defined in claim 2, wherein said beater panels are inflexible and have flat, smooth surfaces on the relatively adjacent sides thereof.

4. A harvesting machine for row crops comprising an ambulatory supporting frame adapted for longitudinal movement along a row of plants, a pair of vertically disposed generally longitudinally extending shaker elements supported from said frame in transversely spaced relation for transverse oscillation about axes substantially coincident with their respective forward edges, and for movement on opposite sides of and in longitudinal sliding relation with the foliage of said plants, and means for transversely oscillating the said shaker elements substantially in phase with each other about their said axes, while maintaining their relative spacing and general longitudinal disposition during the entire operation of the machine, whereby to transversely vibrate the plants received between them for dislodging the produce from said plants.

5. A harvesting machine as defined in claim 4, in which the transverse spacing of said elements is less than the normal transverse width of said foliage of the plants to maintain the said foliage under transverse compression during the vibration of said foliage.

6. A harvesting machine as defined in claim 5, in which said elements comprise smooth surfaced imperforate flat panels for confining between them the produce dislodged from said plants.

7. A harvesting machine as defined in claim 6, further including a flooring arrangement extending longitudinally of said machine below said shaker elements for the reception of produce dislodged from the plants by said elements.

8. A harvesting machine as defined in claim 4, in which said shaker elements converge rearwardly with respect to the movement of the machine to subject the plant foliage to a constantly increasing degree of transverse compression as the machine moves past such foliage.

9. The combination defined in claim 4, in which said means for oscillating the elements includes eccentric means carried by each said shaker elements and power means operatively connected to said eccentric means.

10. The structure defined in claim 9, in which said power means is carried by said ambulatory frame.

11. The combination defined in claim 4, in which said shaker elements are relatively offset longitudinally of the machine in longitudinally overlapping relation.

12. The combination defined in claim 4, in which said means for oscillating the shaker elements includes rotary cam members, and links operatively connecting said cam members to the respective shaker elements.

References Cited in the file of this patent

UNITED STATES PATENTS

| | | |
|---|---|---|
| 450,584 | House | Apr. 14, 1891 |
| 483,475 | Pollock | Sept. 27, 1892 |
| 515,031 | Turner | Feb. 20, 1894 |
| 1,530,707 | Warner | Mar. 24, 1925 |
| 2,660,021 | McDowell | Nov. 24, 1953 |
| 2,763,114 | Carruthers | Sept. 18, 1956 |
| 2,929,184 | Lamouria | Mar. 22, 1960 |
| 2,993,323 | Tubbs | July 25, 1961 |